(12) United States Patent
Hitchcock

(10) Patent No.: US 6,359,420 B1
(45) Date of Patent: Mar. 19, 2002

(54) CIRCUIT FOR COUPLING ENERGY TO A PULSE FORMING NETWORK OR CAPACITOR

(75) Inventor: Roger N. Hitchcock, San Leandro, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 0 days.

(21) Appl. No.: 09/698,333

(22) Filed: Oct. 27, 2000

(51) Int. Cl.[7] ............................................... H02J 7/04
(52) U.S. Cl. ........................................ 320/141; 363/26
(58) Field of Search ........................... 320/141; 363/26, 363/24, 25, 133, 87

(56) References Cited

U.S. PATENT DOCUMENTS

| | | | | |
|---|---|---|---|---|
| 3,716,798 A | | 2/1973 | O'Loughlin | 327/349 |
| 4,301,499 A | * | 11/1981 | Levinson | 363/26 |
| 4,477,867 A | * | 10/1984 | Pellegrino | 363/26 |
| 4,656,570 A | * | 4/1987 | Swoboda | 363/26 |
| 4,751,628 A | * | 6/1988 | Nollet | 363/26 |
| 5,036,450 A | * | 7/1991 | Kelleher, Jr. et al. | 363/26 |
| 5,083,093 A | | 1/1992 | Adler et al. | 327/304 |
| 6,178,101 B1 | * | 1/2001 | Shires | 363/39 |

* cited by examiner

Primary Examiner—Peter S. Wong
Assistant Examiner—Pia Tibbits
(74) Attorney, Agent, or Firm—Workman, Nydegger & Seeley

(57) ABSTRACT

A coupling circuit for charging a pulse forming network (PFN) or capacitor load to a precise voltage is disclosed. The coupling circuit is connected to a DC input voltage source. The circuit includes a charging transformer, having an input winding connected in series with a switch circuit and the DC voltage source. The output winding of the charging transformer is connected to the PFN or capacitor load. A charging inductor is placed in series with the output winding. A control circuit monitors and calculates the total amount of energy present at the load and the charging inductor, and causes the switch circuit to open when the total charge reaches a predefined level, thereby allowing charge stored in the inductor to be transferred to the PFN or capacitor load.

8 Claims, 1 Drawing Sheet

CIRCUIT FOR COUPLING ENERGY TO A PULSE FORMING NETWORK OR CAPACITOR

BACKGROUND OF THE INVENTION

1. The Field of the Invention

The present invention relates generally to circuits used to convert electrical power into high voltage pulses. More specifically, embodiments of the present invention are directed to circuits for coupling a precise amount of power from a DC voltage source to a load, such as a pulse forming network or capacitor so as to allow for the formation of precision high voltage pulses for use by a variety of applications.

2. The Relevant Technology

A number of applications require the use of high voltage signal pulses. For example, various types of pulse forming networks or capacitors have been used to supply short duration, high voltage pulses to various types of loads, such as medical linear accelerator systems, magnetrons, and the like. In the past, one approach for charging such pulse forming networks has been to utilize a charge from a complex, high voltage DC source, such as a 10 kilovolt source, which is then connected to a step up transformer by way of a switch. However, such approaches have not been entirely successful in providing extremely precise output voltage values, a necessity in many precision applications. For example, additional circuits are often required to remove excess energy from the pulse forming network, which then must be dissipated. Such circuits are relatively inefficient, and also require a significant number of electrical components, which increases the cost and complexity of the overall circuitry.

An alternative technique is to utilize standard utility power to couple energy into the pulse forming network or capacitor. However, this approach also requires circuitry for coupling the energy from the low standard utility power into precision high voltage pulses. Unfortunately, the circuitry used in the prior art typically has a significant loss (i.e., poor efficiency) and/or requires elaborate and expensive energy recovery schemes to operate. Again, this increases the complexity and cost of the overall system. Moreover, typical approaches in the prior art utilize circuitry that is relatively limited in its operational range, and thus may not be entirely suitable for certain precision applications.

Consequently, there is a need for circuitry that is capable of converting standard utility power into precision high voltage pulses for use by pulse forming networks or capacitors. Moreover, it would be an improvement if such circuitry is efficient, provides a large operating range, and is relatively simple to implement and utilizes a minimal amount of circuit components. Also, it would be an improvement in the art to provide a coupling circuit that is capable of delivering a precise amount of energy to a load, such as a pulse forming network. Embodiments of the present invention address these and other needs.

BRIEF SUMMARY OF EMBODIMENTS OF THE INVENTION

In view of these and other problems present in the prior art, it is an overall objective of the present invention to provide an improved circuit and method for coupling energy from a voltage source to a pulse forming network or capacitor load. The circuit and method contemplated have ideal application in connection with high power modulator circuits, such as those that may be used in such applications and devices that include radar, accelerators, medical accelerators (e.g., klystron devices), pulsed lasers and the like.

By way of summary, embodiments of the present invention are directed to a coupling circuit that receives energy from a low voltage DC voltage source, and couples it to an energy storage load, such as a pulse forming network. In a preferred embodiment, electrical power is obtained from a standard utility power source having three phases of alternating current. The alternating current is converted to a direct current source using well known techniques.

Disposed between the DC voltage source and the energy storage load is a step-up charging transformer that receives energy from the DC source at its input winding, and provides at its output winding a significantly higher voltage, depending on the desired final voltage required in the energy storage load.

The output of the charging transformer charges the storage load through a charging inductor and charging diodes. In the preferred embodiment, a monitor circuit measures and monitors the current through the charging inductor and the voltage across the storage load. These voltages are utilized by a control circuit to continuously calculate and monitor the total combined energy of the charging inductor and the storage load, i.e., the total amount of energy within the circuit. When the total energy reaches a predetermined value, as indicated by a predefined reference signal having a specified voltage level, the control circuit causes a switching network, disposed between the DC voltage source and the charging transformer, to open. The switch circuit remains in an open, non-conducting state for a predetermined amount of time, corresponding for example to a desired pulse duration. During this open state, energy from the DC voltage source stops flowing into the circuit, and the energy stored within the charging inductor is transferred to the storage load via a conducting diode or any other appropriate circuit element. The pulse forming network or capacitor is then ready to be discharged into the corresponding modulator circuit. This process is then repeated for every charging cycle corresponding, for example, to each pulse generated into the connected device.

Preferred embodiments of the present invention provide several distinct advantages over the prior art. By providing a monitoring and control circuit that continuously monitoring the total energy delivered by the coupling circuit, the load voltage (and energy) can be maintained at a very precise and controllable value. This eliminates any need to remove excess energy from the pulse forming network, and thus increases efficiency and reduces the cost of the overall circuit. Also, since signals that are proportional to circuit energy are used to control and regulate the circuit's operation, the circuit provide a very high degree of accuracy in controlling the load voltage. In addition, since the switches are opened at the point that the energy stored in the load and the energy stored in the inductor are substantially equal to the final desired energy, no unwanted energy is coupled into the circuit, again increasing the efficiency and accuracy of the circuit. The circuit also provides a minimal change in output energy, even with large variations of input DC source voltage.

These and other objects, features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

Figure 1:
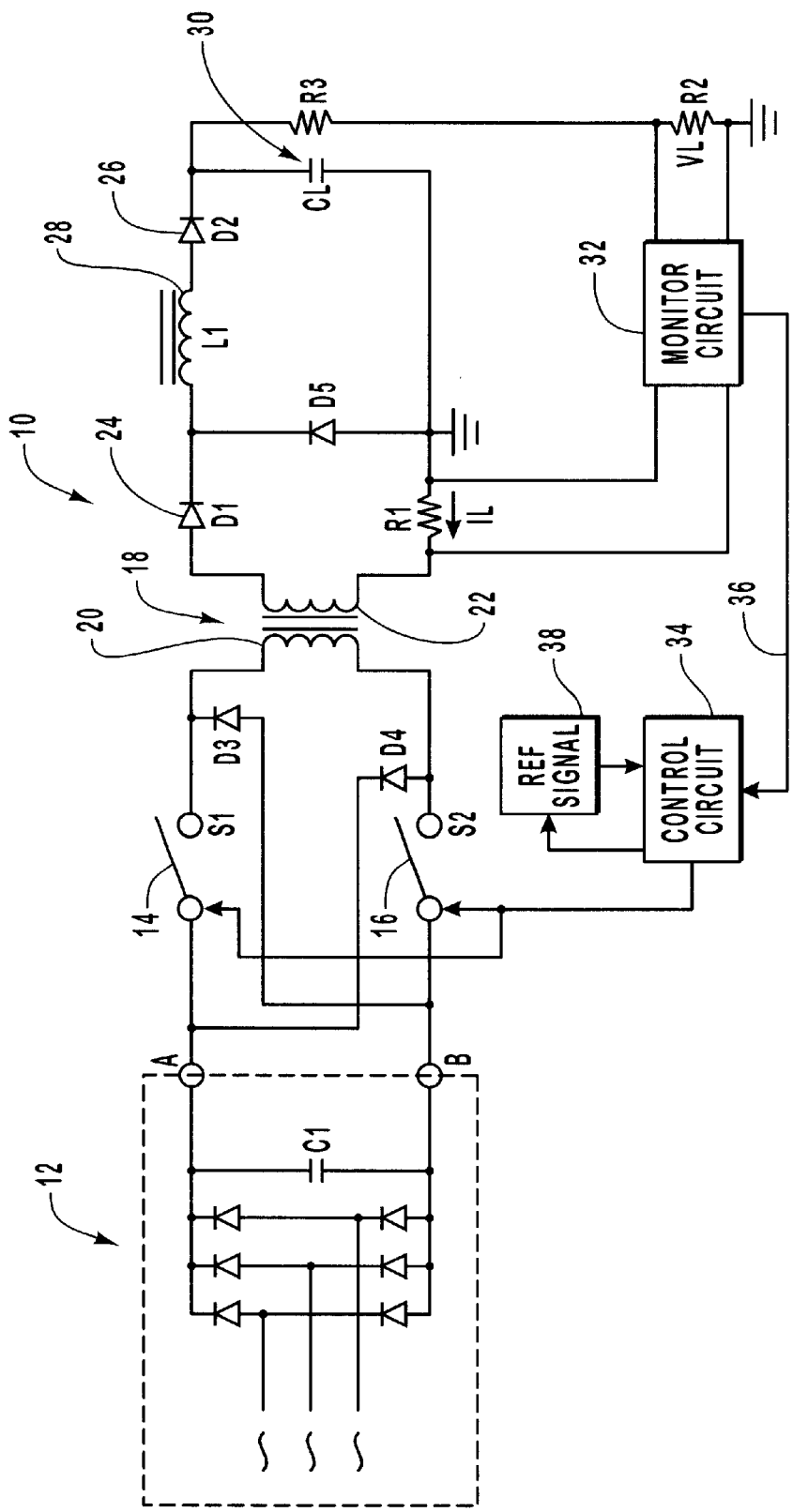
FIG. 1 illustrates an electrical schematic of one presently preferred embodiment of the coupling circuit constructed in accordance with the teachings of the present invention.

Reference will now be made to the drawings to describe in further detail presently preferred embodiments of the invention. It is to be understood that the drawings are diagrammatic and schematic representations of presently preferred embodiments of the invention, and they should not be construed as limiting the scope of the invention.

In general, embodiments of the invention are directed to a method and electrical circuit for efficiently coupling energy into pulse forming networks or capacitors. Embodiments of the present invention will have particular applicability in connection with high power modulator circuits, such as those found in radar devices, accelerators, medical linear accelerators, pulsed lasers and the like.

Reference is first made to FIG. 1, which illustrates an electrical schematic of a coupling circuit constructed in accordance with one presently preferred embodiment of the present invention. The coupling circuit, designated generally at 10, is electrically connected to a DC voltage source, designated at 12, which supplies an input voltage across terminals A and B. In a presently preferred embodiment, the DC voltage source receives input power from a standard utility power source, such as a 60-Hz or 50 Hz (three-phase) input line comprising three phases of alternating current. It will be appreciated that other input power sources could also be used. As is shown, the DC voltage source is a common design, and uses standard rectifier bridge circuits to convert the alternating current to a direct current source. A filter circuit, such as capacitor $C_1$ connected in parallel with the rectifier bridge, is included to improve the signal quality of the input voltage. Other designs could also be used to obtain a desired DC input power.

The DC voltage source is connected at the input of the coupling circuit 10. In a preferred embodiment, that circuit is comprised of a charging switch network, which in the illustrated embodiment is comprised of a pair of switches S1 and S2, designated at 14 and 16 respectfully. While the switches could be implemented using a variety of componentry, in a preferred embodiment they each are comprised of insulated-gate, bipolar junction transistors (IGBT's). Other switch circuits having turn-on and turn-off capability could also be used. The function provided by these switches will be described in further detail below.

The coupling circuit 10 further includes a step-up charging transformer 18. The transformer 18 has a first winding 20 that is connected in series with the DC voltage source 12, and in series with each of the switches S1 and S2.

The output of the charging transformer 18, at winding 22, is connected in series with two charging diodes D1 and D2, designated at 24 and 26 respectfully. Also connected in series with the output 22 of charging transformer is a charging inductor L1, designated at 28, which in the preferred embodiment is connected between each of the diodes D1 and D2.

Also connected in series with output 22 of charging transformer 22 is an energy storage load, designated at 30. By way of example, the energy storage load can be comprised of a pulse forming network, or capacitor, which is in turn connected to an electrical component requiring precision high voltage pulses as an input. As noted, examples of such equipment include medical linear accelerators (such as a klystron), pulsed lasers, radar devices and other such equipment.

Coupling circuit 10 further includes a circuit for measuring the load voltage $V_L$, which in the preferred embodiment is a voltage divider circuit comprised of resistors $R_3$ and $R_2$. In addition, a circuit for measuring the inductor current $I_L$ is provided by way of another resistor $R_1$. Further, in a preferred embodiment, a monitor circuit 32 is connected to the above circuits so as to monitor the magnitude of both values $V_L$ and $I_L$.

As is schematically indicated at line 36, the values corresponding to $V_L$ and $I_L$ are both supplied to a control circuit 34. The control circuit 34 preferably provides several functions. First, the circuit processes the voltage $V_L$ and current $I_L$ values so as to scale and square the signals so as to provide signals that are proportional to the load energy at 30, and the inductor energy at $L_1$:

$$\text{LOAD ENERGY} = \tfrac{1}{2} * C_L * V_L^2$$

where $C_L$ is the capacitance of capacitor $C_L$; and $$\text{INDUCTOR ENERGY} = \tfrac{1}{2} * L_1 * I_L^2$$

where $L_1$ is the inductance of inductor $L_1$.

Thus, by way of example, 100 joules may be represented by a scaled voltage factor, such as 10 volts. Hence, the scaling for the inductor could be such that at 30 joules in the inductor, the output of the scaling and squaring portion of the control circuit would be 3 volts. The same methodology would be applied to the capacitive load energy. As will be appreciated by one of skill in the art, standard analog integrated circuits are available to accomplish this scaling and squaring function. For instance, if the inductance of charging inductor L1 is 0.5 H, at 10 amps the inductor is storing 25 joules. If resistor R1 is 0.25 Ohms, the voltage across R1 is 2.5 volts at 10 amps. Thus, if the 2.5 voltage value is scaled, for example, by an amplifier with a gain of 2, the scaled signal would be 5 volts. Typical analog integrated circuits with squaring functions provide the following relationship between the input and output voltages:

$$V_{OUT} = V_{IN}^2 / 10$$

Consequently, for the above example, $V_{OUT} = (5 \text{ volts})^2 / 10 = 2.52$ volts. As noted, 2.5 volts represents 25 joules under this example, which is the precise energy stored in the inductor. The same type of processing technique applies as well to the capacitor load.

Second, the control circuit 34 sums the two values calculated for load energy and inductor energy to provide a value for the total circuit energy. This value is compared against a reference signal, as is shown at functional box 38, by way of an analog comparator or similar circuitry. In a preferred embodiment, the reference signal corresponds to a predefined voltage value that corresponds to a particular scaled energy level, i.e., in the same ratio as defined for the control circuitry. Thus, a reference signal is chosen that represents the desired energy output level for the pulse signal to the load.

When the comparator portion of the control circuit detects that the total circuit energy reaches this predefined level, it causes the switches $S_1$ and $S_2$ to assume opened positions for the period of time corresponding, for example, to the desired time between charge cycles. Energy from the DC source 12 then stops flowing into the coupling circuit 10, and the energy stored in inductor $L_1$ is transferred into the energy storage load at $C_L$ via the freewheeling diode $D_5$. Advantageously, the final energy in the load has been obtained without adding unwanted energy into the circuit.

It will be appreciated that the charging transformer 18 is designed so as to provide a sufficient turns ratio to produce a high enough voltage on the secondary winding 22 to obtain the desired final voltage in the energy storage load $C_L$. This of course will depend on the particular application in which the circuit is to be used.

In a presently preferred embodiment, the coupling circuit 10 includes an additional means for protecting the switches $S_1$ and $S_2$ from various fault conditions that may occur during operation of the circuit. In the illustrated embodiment, this fault protection means is provided by way of protection diodes $D_3$ and $D_4$, connected in the manner shown in FIG. 1. For example, diodes $D_3$ and $D_4$ protect the switches in the event that there is a short at load, or similar fault conditions. In addition, when the switches are placed in an open state, there is residual energy stored in the primary winding 20 of the charging transformer 18. This energy must be discharged, and the diodes permit this stored energy to released back to the power source 12. Alternatively, the energy could be dissipated through a resistive network. In a typical embodiment, the amount of residual energy in the primary winding is relatively small, typically less than about 2% of the total energy transferred to the load.

It will be appreciated that the illustrated embodiment provides a number of features and advantages over prior art implementations. In particular, the coupling circuit provides the ability to efficiently couple energy from a low voltage DC source to a pulse forming network or capacitor, and does so in a manner such that the load voltage (and corresponding energy) is maintained at a precise value. This permits, for example, high power modulator circuits to generate precise and high-power rectangular pulses, that are used in a variety of applications, such as a medical linear accelerator. In addition, the illustrated coupling circuit utilizes signals proportional to the circuit energy as a means for controlling and regulating the functioning of the circuit, thereby providing a very accurate control of the load voltage at very high efficiencies. The circuit also avoids the coupling or dissipation of unwanted energy within the circuit itself, because of the high degree of control over the switches, which can be opened when the energy stored in the load and the energy stored in the inductor are equivalent to the final desired energy stored in the load.

Another advantage is that the illustrated coupling circuit provides a full range of output load voltage. In particular, the circuit allows control of the output energy from a predefined minimum to a maximum value, without any significant impact on the circuit efficiency. Further, the circuit provides a minimal change in output energy even with large variations of input DC source voltage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An electrical coupling circuit for charging a load, such as a pulse forming network or capacitor load, to a precise voltage level, the coupling circuit comprising:

an energy source;

a transformer having an input winding connected to receive input power from the energy source;

a switch circuit capable of selectively assuming a substantially open state or a substantially closed state, wherein the open state substantially prevents input power from passing from the energy source to the input winding of the transformer;

an inductive charging circuit connected between an output winding of the transformer and the load; and a control circuit that causes the switch circuit to assume the substantially open state for a predetermined amount of time when the sum of the magnitude of the energy stored in the load and in the inductive charging circuit is substantially equal to a predetermined value, thereby allowing energy stored in the inductive charging circuit to be transferred to the load.

2. An electrical coupling circuit as defined in claim 1, wherein the energy source is a DC voltage source.

3. An electrical coupling circuit as defined in claim 1, further comprising means for transferring residual energy stored in the input winding of the transformer to the energy source when the switch circuit is placed in the open state.

4. An electrical coupling circuit as defined in claim 1, wherein the switch circuit is comprised of a first and a second switch connected in series with the input winding of the transformer.

5. An electrical coupling circuit as defined in claim 1, wherein the transformer is configured to step up a voltage placed on the input winding of the transformer.

6. An electrical coupling circuit as defined in claim 1, wherein the inductive charging circuit is comprised of at least one inductor.

7. An electrical coupling circuit as defined in claim 1, further comprising:

a circuit connected to measure the magnitude of the voltage across the lead;

a circuit connected to measure the magnitude of the current flowing through the inductive charging circuit; and wherein the magnitude of the load voltage and the magnitude of the charging circuit current are each supplied to the control circuit.

8. A method of supplying a voltage to a load, the method comprising the steps of:

supplying a constant input voltage;

continuously storing the energy received from the input voltage within a storage circuit; and monitoring the magnitude of the stored energy in the storage circuit such that when the magnitude equals a predetermined value the following steps are performed: switching off substantially all of the input voltage; and discharging the stored energy to the load.

\* \* \* \* \*

UNITED STATES PATENT AND TRADEMARK OFFICE
CERTIFICATE OF CORRECTION

PATENT NO.     : 6,359,420 B1
DATED          : March 19, 2002
INVENTOR(S)    : Roger N. Hitchcock It is certified that error appears in the above-identified patent and that said Letters Patent is hereby corrected as shown below:

Column 4,
Line 51, before "volts." change "2.52" to -- 2.5 --

Column 5,
Line 27, before "back" change "released" to -- release --

Signed and Sealed this

Twenty-fifth Day of February, 2003

JAMES E. ROGAN
*Director of the United States Patent and Trademark Office*

UNITED STATES PATENT AND TRADEMARK OFFICE
CERTIFICATE OF CORRECTION

PATENT NO.      : 6,359,420 B1                                        Page 1 of 1
DATED           : March 19, 2002
INVENTOR(S)     : Roger N. Hitchcock It is certified that error appears in the above-identified patent and that said Letters Patent is hereby corrected as shown below:

<u>Column 4,</u>
Line 51, before "volts." change "2.52" to -- 2.5 --

<u>Column 5,</u>
Line 27, before "back" change "released" to -- release --

Signed and Sealed this

Twenty-third Day of December, 2003

JAMES E. ROGAN
*Director of the United States Patent and Trademark Office*